(12) United States Patent
Gilbertson et al.

(10) Patent No.: US 11,279,324 B2
(45) Date of Patent: Mar. 22, 2022

(54) ROTARY WIPER SYSTEM

(71) Applicant: Waymo LLC, Mountain View, CA (US)

(72) Inventors: Seth Gilbertson, Dublin, CA (US); Felix Jose Alvarez Rivera, Tarzana, CA (US); Roger Best, Carlsbad, CA (US)

(73) Assignee: Waymo LLC, Mountain View, CA (US)

( * ) Notice: Subject to any disclaimer, the term of this patent is extended or adjusted under 35 U.S.C. 154(b) by 390 days.

(21) Appl. No.: 16/229,506

(22) Filed: Dec. 21, 2018

(65) Prior Publication Data

US 2020/0094786 A1 Mar. 26, 2020

Related U.S. Application Data

(60) Provisional application No. 62/736,573, filed on Sep. 26, 2018.

(51) Int. Cl.
| | | |
|---|---|---|
| *B60S 1/38* | (2006.01) | |
| *B60S 1/60* | (2006.01) | |
| *B60S 1/34* | (2006.01) | |
| *B60S 1/56* | (2006.01) | |
| *B60S 1/08* | (2006.01) | |
| *B08B 1/04* | (2006.01) | |

(52) U.S. Cl.
CPC .............. *B60S 1/38* (2013.01); *B60S 1/0822* (2013.01); *B60S 1/34* (2013.01); *B60S 1/566* (2013.01); *B60S 1/60* (2013.01); *B08B 1/04* (2013.01)

(58) Field of Classification Search
CPC .. B60S 1/04; B60S 1/38; B60S 1/0822; B60S 1/34; B60S 1/566; B60S 1/60; B60S 1/0848; B08B 1/002; B08B 1/005; B08B 1/006; G08B 13/19619; B60R 11/04; G02B 27/0006
USPC .............................. 15/250.29, 250.24, 250.11
See application file for complete search history.

(56) References Cited

U.S. PATENT DOCUMENTS

| | | | |
|---|---|---|---|
| 3,493,804 A | 2/1970 | Harvey | |
| 5,142,729 A | 9/1992 | Imamura | |
| 9,731,688 B2 * | 8/2017 | Doorley | B60S 1/566 |

(Continued)

FOREIGN PATENT DOCUMENTS

| | | |
|---|---|---|
| CN | 105611121 A | 5/2016 |
| KR | 101043479 B1 | 6/2011 |

OTHER PUBLICATIONS

International Search Report and Written Opinion for Application No. PCT/US2019/051668 dated Jan. 14, 2020.

*Primary Examiner* — Katina N. Henson
(74) *Attorney, Agent, or Firm* — Botos Churchill IP Law

(57) ABSTRACT

The disclosure provides for a wiper system for cleaning a surface of a sensor housing, such as a sensor housing positioned on top of a vehicle. The wiper system includes a plurality of windows spaced around a sensor housing, and a plurality of wipers positioned around the sensor housing, each of the wipers includes a wiper blade configured to clean a corresponding window of the plurality of windows. The wiper system further includes a drive system including a movable part coupled to a motor. The motor is configured to drive the drive system to simultaneously rotate the plurality of wipers around the sensor housing such that the plurality of wipers remove debris from the plurality of windows.

21 Claims, 11 Drawing Sheets

(56) References Cited

U.S. PATENT DOCUMENTS

| | | |
|---|---|---|
| 9,733,472 B2 | 8/2017 | Tago |
| 9,855,925 B2 | 1/2018 | Doorley et al. |
| 2008/0072393 A1 | 3/2008 | Tanaka |
| 2018/0009418 A1 | 1/2018 | Newman |

* cited by examiner

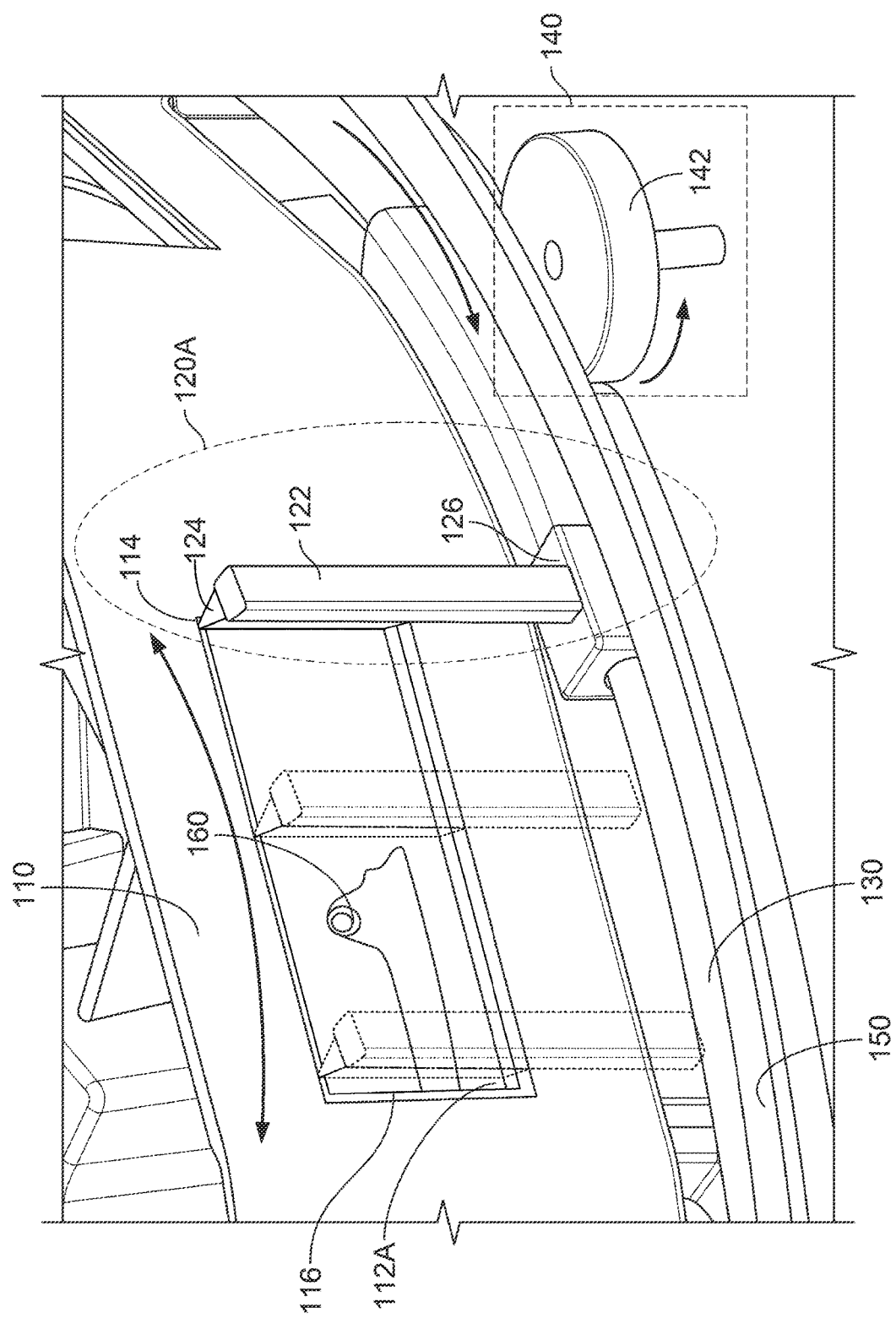

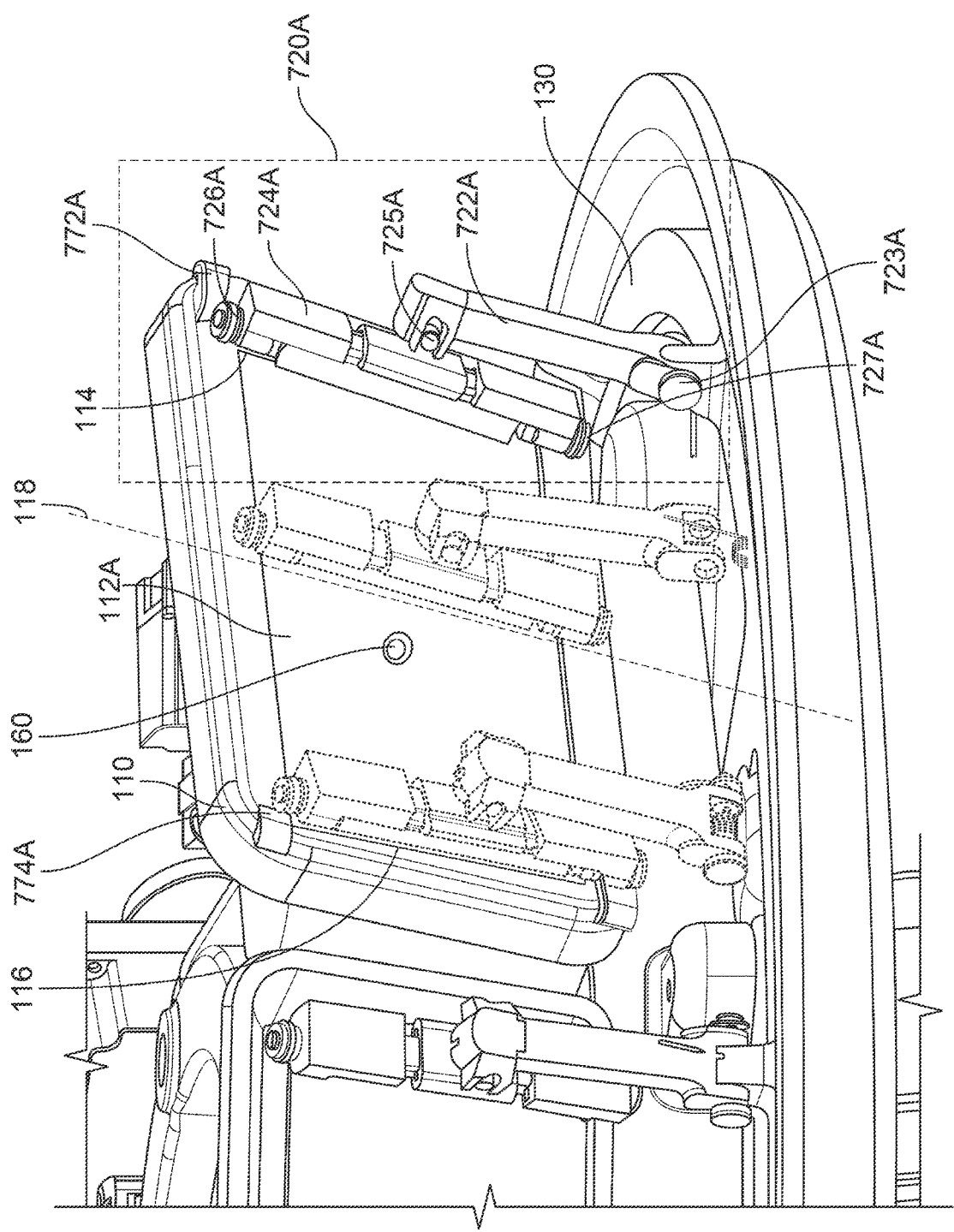

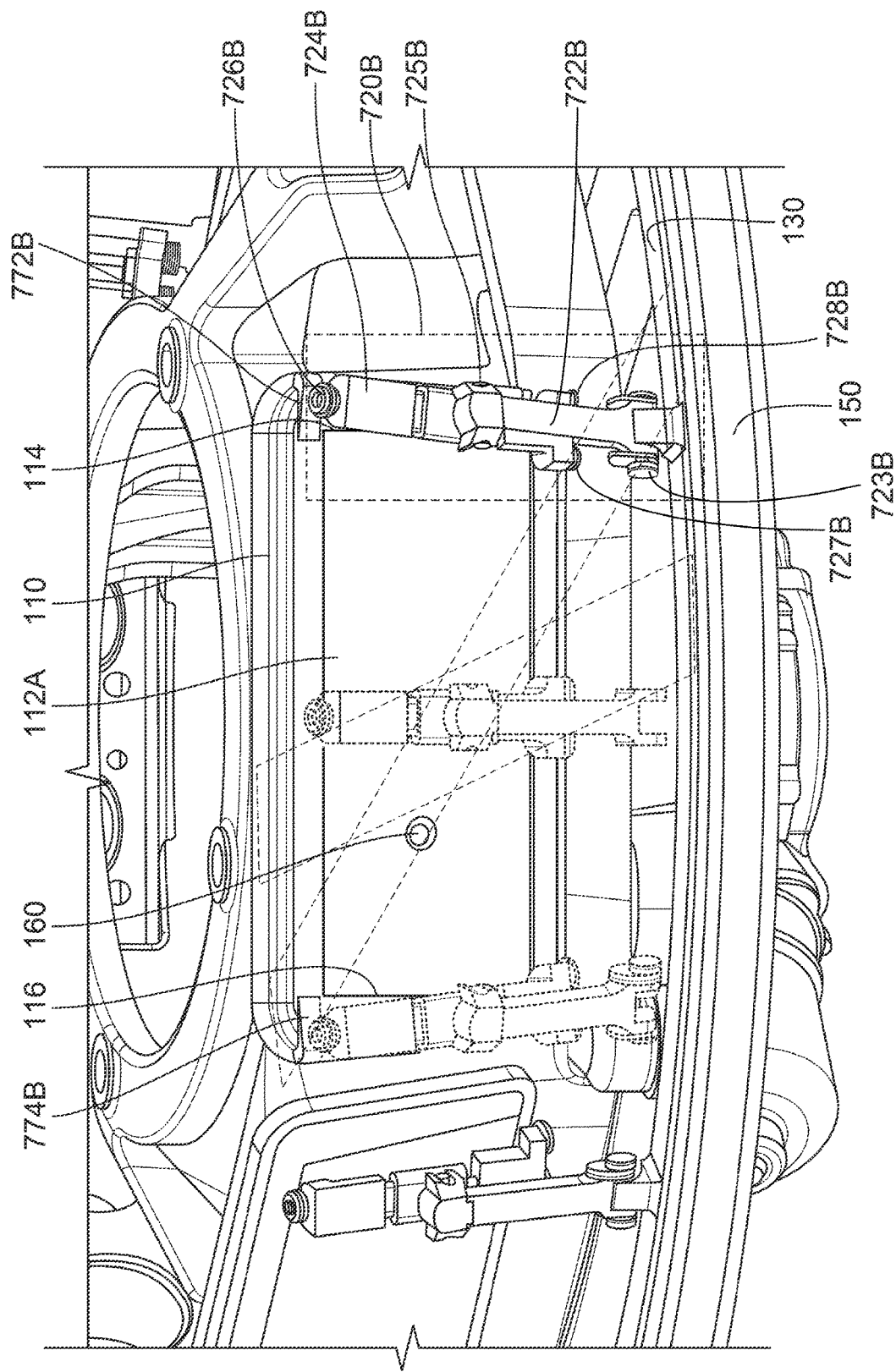

ROTARY WIPER SYSTEM

CROSS-REFERENCE TO RELATED APPLICATIONS

This application claims the benefit of the filing date of U.S. Provisional Patent Application No. 62/736,573 filed Sep. 26, 2018, the disclosure of which is hereby incorporated herein by reference.

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, etc., which can cause a buildup of debris and contaminants on these sensors. Typically, the sensors include a cover or an aperture to protect the internal sensor components of the sensors from the debris and contaminants, but over time, the cover itself may become dirty. As such, the functions of the sensor components may be impeded as signals transmitted and received by the internal sensor components are blocked by the debris and contaminants.

BRIEF SUMMARY

Aspects of the disclosure provide a system comprising a plurality of windows spaced around a sensor housing; a plurality of wipers positioned around the sensor housing, each of the wipers includes a wiper blade configured to clean a corresponding window of the plurality of windows; a drive system including a movable part coupled to a motor; and the motor configured to drive the drive system to simultaneously rotate the plurality of wipers around the sensor housing such that the plurality of wipers remove debris from the plurality of windows.

The motor may be configured to drive the drive system such that each of the plurality of wipers oscillates between a first edge of one of the windows to a second edge of one of the windows, such that each of the plurality of wipers moves from the first edge to the second edge in a first direction, and from the second edge to the first edge in a second direction.

The system may further comprise a wiper ring positioned around the sensor housing, the plurality of wipers are fixedly attached to the wiper ring such that rotation of the wiper ring simultaneously rotates the plurality of wipers. The drive system may include a friction wheel in contact with the wiper ring such that, when the friction wheel rotates in a first direction, a friction force between the friction wheel and the wiper ring causes the wiper ring to rotate in a second direction opposite of the first direction. The drive system may include a gear having a first set of grooves configured to engage with a second set of grooves on the wiper ring such that rotation of the gear in a first direction causes the wiper ring to rotate in a second direction opposite of the first direction.

The system may further comprise a second motor configured to rotate each given one of the wipers about a respective longitudinal axis of the given one.

Each given one of the wipers may be configured to rotate about a respective longitudinal axis of the given one such that the wiper blade of the given one is not in contact with a surface of the corresponding window for the given one. Each given one of the wipers may be configured to rotate about the respective longitudinal axis of the given one when the given one reaches an edge of the corresponding window for the given one.

Each given one of the wipers may be configured to rotate about a respective longitudinal axis of the given one such that the wiper blade of the given one contacts a surface of the corresponding window for the given one at a non-perpendicular angle towards a movement direction of the given one. Each given one of the wipers may be configured to rotate about the respective longitudinal axis of the given one when the given one reaches an edge of the corresponding window for the given one.

The system may further comprise one or more sensors are positioned inside the sensor housing, the one or more sensors configured to transmit signals through the plurality of windows on the sensor housing. The motor may be configured to drive the drive system to rotate the plurality of wipers at a first threshold speed, wherein, when driven at the first threshold speed, the wiper blades are not visible to the one or more sensors for at least one of a predetermined number of consecutive signal transmissions.

The system may further comprise one or more sensors for detecting an amount of debris encountered by the sensor housing. The motor may be configured to drive the drive system to rotate the plurality of wipers at a second threshold speed, and wherein, when driven at the second threshold speed, at least one of a predetermined number of consecutive signal transmissions are made through the plurality of windows with a threshold amount of debris.

The system may further comprise a vehicle, wherein the sensor housing is mounted on a roof of the vehicle.

The system may further comprise a vehicle having one or more processors configured to control movements of the motor. The one or more processors may be configured to receive sensor signals from one or more sensors for detecting an amount of debris encountered by the sensor housing, and control operation of the motor based on the sensor signals. The one or more processors may be configured to receive sensor signals from one or more sensors positioned inside the sensor housing, and control operation of the motor based on a quality of the sensor signals.

The system may further comprise a spring pivotally connecting a wiper arm of each given one of the wipers to the wiper ring; a plurality of rollers attached to the wiper blade of each given one of the wipers, the plurality of rollers counteract a force between the wiper blade and the window. Two of the plurality of rollers may be positioned at two sides of one end of the wiper blade. The system may further comprise at least one ramp positioned on the sensor housing along an edge of each given one of the windows, the ramp configured to push against the plurality of rollers of each given one of the wipers so that an orientation of the wiper blade of each given one of the rollers is adjusted.

The system may further comprise a ball joint pivotally connecting a wiper arm of each given one of the wipers to the wiper blade of each given one of the wipers such that the wiper blade is configured to rotate about a horizontal axis with respect to the wiper arm.

BRIEF DESCRIPTION OF THE DRAWINGS

FIGS. 1A-1C illustrate an example wiper system in accordance with aspects of the disclosure.

FIG. 7A illustrates another example wiper system in accordance with aspects of the disclosure.

FIGS. 7B and 7C illustrate another example wiper system in accordance with aspects of the disclosure.

DETAILED DESCRIPTION

Overview

Figure 1A:
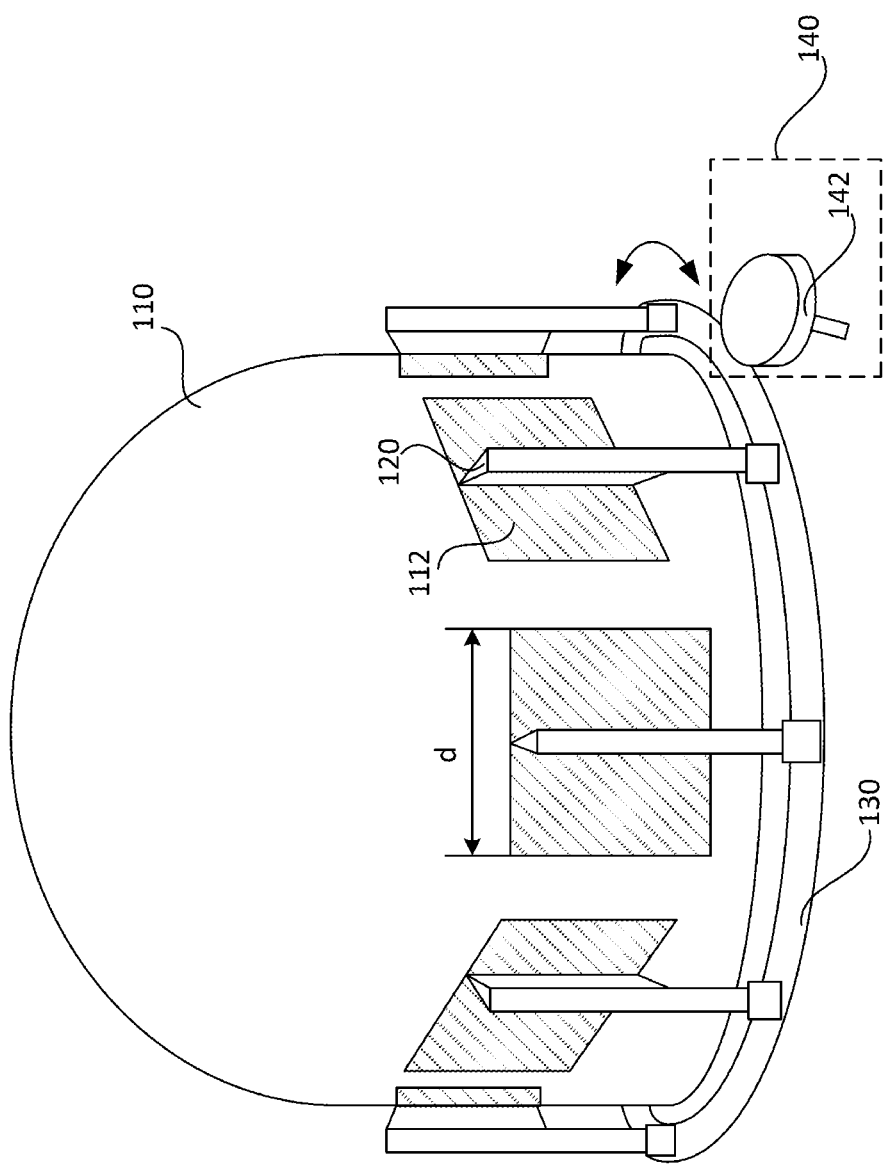

The technology generally relates to a wiper system for cleaning a surface of a sensor housing, such as a sensor housing positioned on top of a vehicle. For example, the sensor housing may be a dome, a cylinder, polygonal, or some other shape. Various camera/sensor equipment may transmit and receive signals through windows on the sensor housing. The functions of the camera/sensor equipment may be impacted as debris and contaminants accumulate on these windows. To address this, a wiper system is provided to wipe the debris and contaminants off the windows of the sensor housing. The wiper system includes a plurality of wipers positioned around a circumference of a sensor housing, a motor, and a drive system configured to move the wipers between various positions around the circumference of the sensor housing.

The wiper system includes a wiper ring to support the plurality of wipers and to enable their movements around the circumference of the sensor housing. In this regard, the drive system and the motor of the wiper system may be configured to rotate the wiper ring. For example, the drive system may include a friction wheel that is in contact with the wiper ring such that, when the friction wheel rotates, a friction force between the friction wheel and the wiper ring is sufficient to cause the wiper ring to rotate in an opposite direction as the friction wheel. One or more ring supports are provided to hold the wiper ring in place while allowing the wiper ring to rotate, for example by engaging an inner surface of the wiper ring. Thus, as the friction wheel rotates, for example when driven by the motor, the friction wheel may cause the wiper ring to rotate, which in turn causes the plurality of wipers to rotate.

As an alternative to using a friction wheel, the drive system may include a gear provided with a first set of grooves that matches a second set of grooves on the outer surface of the wiper ring. As such, the first set of grooves on the gear engages the second set of grooves on the outer surface of the wiper ring. As the gear rotates, it causes the wiper ring to rotate in an opposite direction, which in turn causes the plurality of wipers to rotate. As another alternative, a direct drive approach or a bell drive approach may be used.

The motor may be configured to drive the plurality of wipers in both a counterclockwise direction and a clockwise direction around the circumference of the sensor housing. In some examples, the motor may be configured to drive the plurality of wipers repeatedly from a set of first positions to a set of second positions in a first direction, then back from the set of second positions to the set of first positions in a second direction, and so on. For example, each of the plurality of wipers may be driven between two fixed positions, such as between two edges of various windows on the sensor housing. As such, each of the wipers may be dedicated to cleaning one window. This way, all the windows on the sensor housing may be simultaneously cleaned by the plurality of wipers. As yet another example, for a particularly large window, two of the wipers may be configured to each clean half of the large window. In these configurations, the plurality of wipers only clean portions of the sensor housing where debris and contaminants affect the sensor/camera equipment, and not waste energy elsewhere.

The motor may be configured to drive the plurality of wipers at a range of speeds. For example, the speed may be set based on the amount of debris encountered. For another example, the speed may be set such that the wiper blade is not visible to the sensor/camera equipment in the sensor housing for more than a predetermined number of consecutive signal transmissions. In this regard, the wiper system may include one or more sensors for detecting the amount of debris encountered, as well as one or more processors for analyzing sensor signals and for controlling the motor.

In some examples, the wiper arm may be configured to rotate about its longitudinal axis. In this regard, a second motor may be provided to rotate the wiper arms, or alternatively, springs may be provided to cause rotation at fixed locations. The wiper arm may be configured to rotate by an angle such that the wiper blade is no longer in contact with the surface of the sensor housing. This way, the rotation may remove the debris and contaminants collected on the wiper blade. Additionally or alternatively, the wiper arm may also be configured to rotate such that the wiper blade maintains contact with the window at a non-perpendicular angle towards a direction of its movement. Such an orientation may allow the wiper blades to provide better cleaning. Additionally or alternatively, one or more rollers may be added to the wiper blades to counteract the forces applied by the wiper blades against the window surface. One or more ramps may be provided on the sensor housing to allow the wiper blades to separate from the window surface and reset in orientation.

The features described here provide for efficient cleaning of a surface of a sensor housing. The wiper system use multiple wipers to continuously and simultaneously clean various portions of the sensor housing, such as various windows on the sensor housing. Also, because the wipers are able to rotate about a longitudinal axis, they are able to remove debris and contaminants collected on the wipers, thereby preventing such collected debris and contaminants from being dragged back and forth across the windows. The wiper system may use sensors and processors to control the movements of the wipers to better serve the need of the various equipment housed in the sensor housing.

Example Systems

Figure 1B:
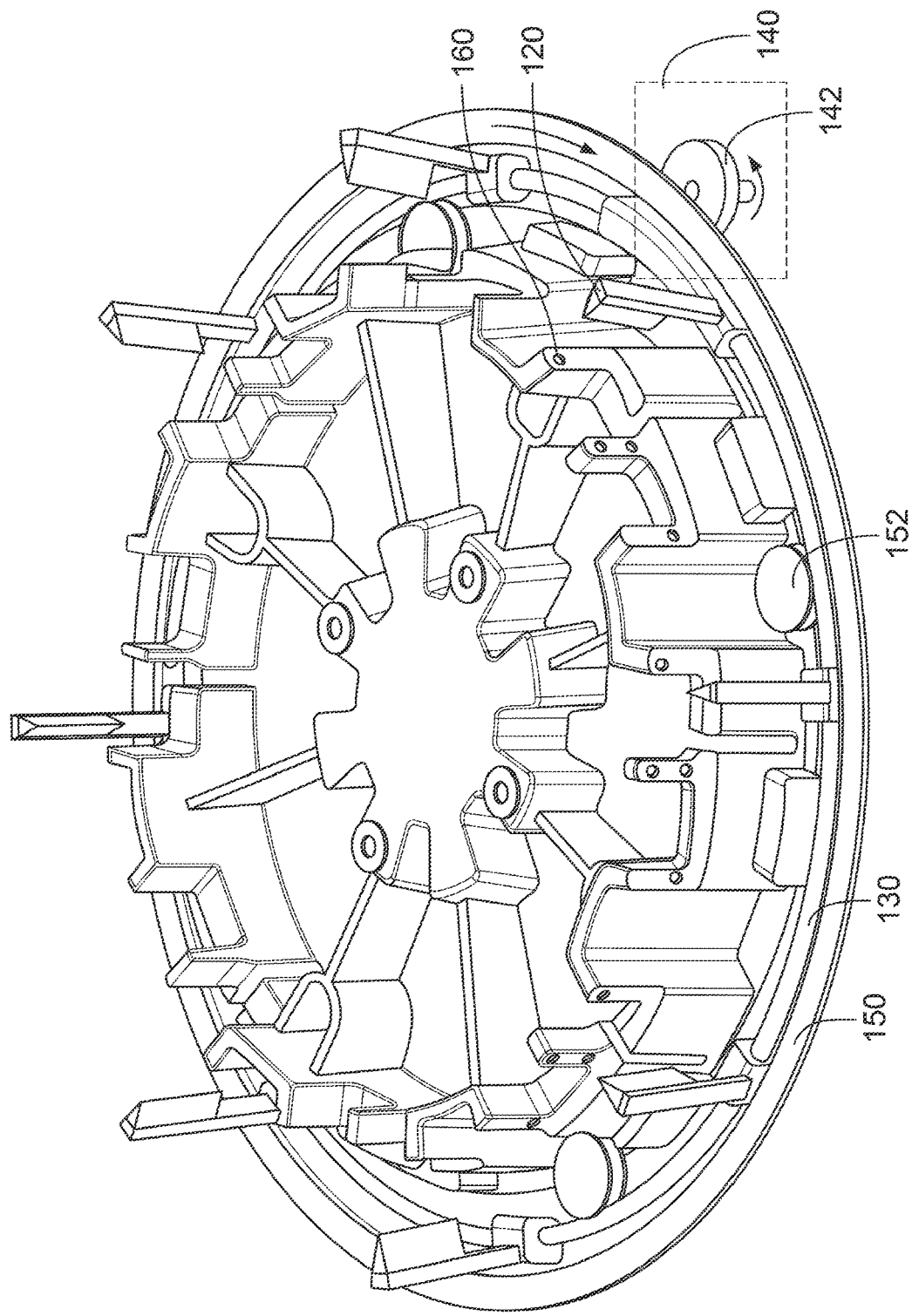

FIGS. 1A-1C show an example wiper system 100 according to aspects of the disclosure. FIG. 1A shows a perspective view of the example wiper system 100 with a sensor housing 110. FIG. 1B shows another perspective view of the example wiper system 100 where the sensor housing 110 is removed, exposing interior components. FIG. 1C shows a close-up perspective view of the example wiper system 100, focusing on one example wiper 120A.

As shown in FIG. 1A, the wiper system 100 includes a sensor housing 110. As shown, the sensor housing 110 has a cylindrical body and a semispherical dome on top of the cylindrical body, and thus has a circular based and cross section. Alternatively, the sensor housing 110 may be any other shape and/or cross section such as a polygon which can accommodate a rotating ring to move a plurality of wipers. The sensor housing 110 has a plurality of windows 112 positioned around the sensor housing 110. The plurality of windows 112 may have a planar surface or a curved surface. As shown in FIG. 1B, the sensor housing 110 may be positioned on top of a base plate 150. For example, the base plate 150 may be fixedly connected to a roof of a vehicle. The sensor housing 110 and the base plate 150 may be comprised of materials such as metals, plastics, glass, etc. The plurality of windows 112 may be comprised of materials that permit transmissions of sensor signals, such as plastic, glass, polycarbonate, polystyrene, acrylic, polyester, etc.

The sensor housing 110 and the base plate 150 support and protect various structures and components therein, including one or more sensors 160. For example, the sensors 160 may include a LIDAR, radar, sonar, camera, or other such imaging sensor that scan and record data from the vehicle's environment. These sensors 160 may transmit and receive signals through the plurality of windows 112 on the sensor housing 110. The functions of the sensors 160 may be impacted as debris and contaminants accumulate on the plurality of windows 112. To address this, a plurality of wipers 120 are provided around a circumference of the sensor housing 110 to wipe the debris and contaminants off the plurality of windows 112.

FIG. 1C shows a detail view of an example wiper 120A of the plurality of wipers 120. The wiper 120A includes a wiper arm 122 and a wiper blade 124 attached to the wiper arm 122. Alternatively, the wiper 120A may have multiple wiper blades. The wiper blade 124 is positioned to be in contact with a surface of the sensor housing 110 for wiping the surface of the sensor housing 110, such as a surface of window 112A of the plurality of windows 112. As shown, the wiper arm 122 is in an upright position perpendicular to the base plate 150 of the sensor housing 110. Alternatively, the wiper arm 122 may be in an upright position at a non-perpendicular angle to the base plate 150 of the sensor housing 110. The wiper 120A further includes a wiper support 126, which is configured to fixedly connect to a moving component of the wiper system 100, such as wiper ring 130.

The wiper arm 122 and/or the wiper support 126 may be comprised of rigid materials, such as metals, plastics, and glass. The wiper blade 124 may be comprised of materials capable of removing debris, such as rubber (e.g., buna, ethylene propylene diene monomer (EPDM), silicone, etc.) or plastic (urethane, polyethylene, etc.). The wiper blade 124 may also be comprised of a solid or sponge-like foam or fabric (e.g., woven fabric, felted fabric, etc.). In some examples, a tube (not shown) may be included within the wiper arm 122 or wiper blade 124 for releasing a cleaning fluid from a spraying device onto the surface of the sensor housing 110.

As shown in FIG. 1A, the wiper system 100 includes a drive system 140 and a motor, for instance a small electric motor (not shown here, shown as 650 in FIG. 6), for moving the plurality of wipers 120 between various positions around the circumference of the sensor housing 110. The wiper system 100 also includes a wiper ring 130 for supporting the plurality of wipers 120 and to enable their movements around the circumference of the sensor housing 110. In this regard, the motor is configured to drive the drive system 140 to rotate the wiper ring 130, and since the plurality of wipers 120 are fixedly connected to the wiper ring 130, the plurality of wipers 120 would rotate with the wiper ring 130.

For example, as shown in FIGS. 1A-1C, the drive system 140 includes a friction wheel 142 that is in contact with the wiper ring 130 such that, when the friction wheel 142 rotates, a friction force between the friction wheel 142 and the wiper ring 130 is sufficient to cause the wiper ring 130 to rotate in an opposite direction as the friction wheel 142. Thus, as the friction wheel 142 of the drive system 140 rotates in a first direction, for example when driven by the motor, the friction wheel 142 may cause the wiper ring 130 to rotate in a second direction opposite to the first direction, which in turn causes the plurality of wipers 120 to also rotate in the second direction.

As shown in FIG. 1B, the wiper ring 130 is provided within the base plate 150 of the sensor housing 110. The friction wheel 142 of the drive system 140 is positioned outside the base plate 150 and engages an outer surface of the wiper ring 130. As an example, the motor and friction wheel may be attached to the base plate through an opening in the base plate. A seal may be formed when the motor is attached to the base plate. One or more ring supports 152 are provided within the base plate 150 to hold the wiper ring 130 in place while allowing the wiper ring 130 to rotate, for example by engaging an inner surface of the wiper ring 130. The wiper ring 130 may be comprised of a rigid material, such as metals, plastics, and glass.

The motor may be configured to drive the plurality of wipers 120 in both a counterclockwise direction and a clockwise direction around the circumference of the sensor housing 110. In some examples, the motor may be configured to drive the plurality of wipers 120 repeatedly from a set of first positions to a set of second positions in a first direction, then back from the set of second positions to the set of first positions in a second direction, and so on.

For example, FIG. 1C shows an example operation of the wiper 120A. The wiper 120A is shown to be positioned at a right edge 114 of the window 112A. As shown by the series of dotted blades indicating movements of the wiper blade 124, the wiper 120A may be driven in a clockwise direction from the right edge 114 of the window 112A to the left edge 116 of the window 112A. Once the wiper 120A reaches the left edge 116 of the window 112A, the wiper 120A may be driven in a counterclockwise direction from the left edge 116 of the window 112A back to the right edge 114 of the window 112A, and so on. This way, the wiper 120A is dedicated to clean the window 112A by repeatedly moving back and forth (oscillating) between the two edges 114 and 116.

Each of the plurality of wipers 120 shown in FIG. 1A may similarly be driven between two fixed positions, such as oscillating between two edges of each of the plurality of windows 112 on the sensor housing 110. As such, each of the plurality of wipers 120 may be dedicated to clean one respective window of the plurality of windows 112. For example, where each of the plurality of windows 112 has a same width d, each of the plurality of wipers 120 may have a starting position (e.g., a parked position) at a first edge of the respective window of the plurality of windows 112. The drive system 140 may be configured to rotate the wiper ring 130 in a first direction by a distance d such that each of the plurality of wipers 120 would reach an ending position (e.g., position at full stroke) at a second edge of the respective window of the plurality of windows 112, then back in an opposite second direction by the distance d such that each of the plurality of wipers 120 would return to the first edge of the respective window of the plurality of windows 112, and so on. This way, the plurality of windows 112 on the sensor housing 110 may be simultaneously cleaned by the plurality of wipers 120.

As another example, if there is one or more particularly large window (for example having a width of 2d) among the plurality of windows 112, two of the plurality of wipers 120 may be dedicated to clean such a large window. For example, one of the two wipers may have a starting position or parked position at a first edge of the large window, and the other of the two wipers may have a starting position or parked position at a midpoint between the first edge and a second edge of the large window. The drive system 140 may still be configured to rotate the wiper ring 130 back and forth in both the first and second directions by the distance d (the width of the smaller windows). However, in this configuration, each of the two wipers dedicated to clean the large window would only clean half of the large window. This way, the plurality of windows 112 on the sensor housing 110 may still be simultaneously cleaned by the plurality of wipers 120. In other examples, where an even larger window is included on the sensor housing 110, three or more of the plurality of wipers 120 may be dedicated to clean the large window. In still other examples, where the plurality of windows 112 have different widths, the drive system 140 may be configured to rotate the wiper ring 130 back and forth in both the first and second directions by the largest width among the plurality of windows 112.

Thus, in these above example configurations, the plurality of wipers 120 are configured to focus on cleaning the portions of the sensor housing 110 where debris and contaminants affect the sensor 160—the surfaces of the plurality of windows 112. The motor may control the rotation of the ring, for instance, how many degrees the ring rotates. However, in some instances, the wiper ring 130 or the base plate 150 may include one or more stoppers (not shown) positioned at fixed positions, for example at edges of the plurality of windows 112, so that rotations of the wiper ring 130 and the plurality of wipers 120 are constrained by these stoppers. Alternatively or additionally, the wiper system 100 may include one or more processors (not shown) that control the motor that drives the drive system 140 such that the drive system 140 rotates the wiper ring 130 back and forth by a fixed distance.

The motor may also be configured to drive the plurality of wipers 120 at a range of speeds. For example, when a large threshold amount of debris is encountered, the motor may drive the plurality of wipers 120 at a high speed threshold. For instance, the high speed threshold may be set such that at least one in every predetermined number of consecutive signal transmissions by the sensors 160 are transmitted substantially free of debris (for example below a minimal threshold amount), such as one in every three consecutive signal transmissions. For another example, when a small threshold amount of debris is encountered, the motor may drive the plurality of wipers 120 at a low speed threshold. For instance, the low speed threshold may be set such that the plurality of wipers 120 are not visible to the one or more sensors 160 for at least one of a predetermined number of consecutive signal transmissions, such as at least one of three consecutive signal transmissions.

The large threshold amount, the small threshold amount, and the minimal threshold amount of debris may be predetermined empirically, for example based on effects on the functions of the sensor 160. For example, the large threshold amount may be an amount of debris required to block more than 80% of sensor signals to/from sensors 160. For another example, the small threshold amount may be an amount of debris required to block less than 20% of sensor signals to/from sensors 160. For still another example, the minimal threshold amount may be an amount of debris required to block less than 5% of sensor signals to/from sensors 160. Additionally or alternatively, one of more of the sensors 160 may be configured for detecting the amount of debris encountered, for example by detecting a weight or pressure on the plurality of windows 112, or by taking images of the plurality of windows 112. The wiper system 100 may include one or more processors (not shown) that receive sensor signals from the sensors 160, and control the motor based on these sensor signals.

In some examples, each of the plurality of wipers 120 may be configured to rotate about its longitudinal axis. For example, FIGS. 2A-2D and 3A-3D show example operations of an example wiper 120B configured to rotate about its longitudinal axis. Although not shown, the example wiper 120B may be part of a wiper system, such as wiper system 100 including the wiper ring 130, the drive system 140, the motor, the sensor housing 110, and the plurality of windows 112, etc. The wiper 120B includes a wiper arm 122B that is pivotally connected to the wiper support 126B, for example through a pin or a screw 128, such that the wiper arm 122B may rotate about its longitudinal axis. Alternatively or additionally, though not shown, the wiper support 126B may be pivotally connected to the wiper ring 130, for example though a pin or a screw, such that a rotation of the wiper support 126B may rotate the wiper arm 122B about its longitudinal axis. A second motor, for instance a small electric motor (not shown here, shown as 650 in FIG. 6), may be provided to rotate the wiper arm 122B and/or the wiper support 126B. One or more processors (not shown) may be configured to control the second motor. As an alternative to using the second motor, springs (not shown) may be provided to cause such rotations at fixed locations on the wiper ring 130.

Figure 2D:
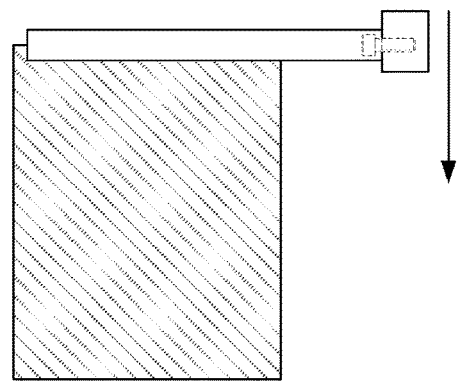
FIGS. 2A-D are illustrations of an example operation of an example wiper according to aspects of the disclosure.
Figure 2C:
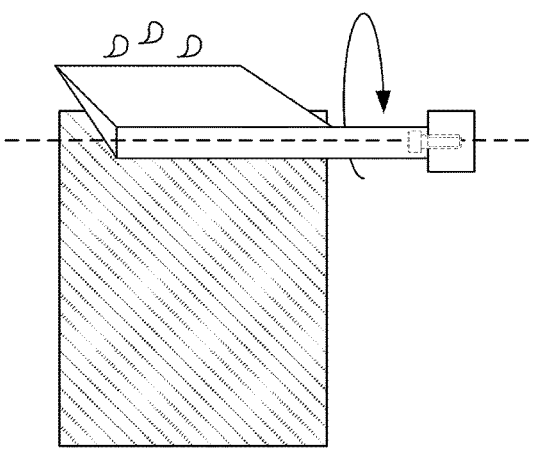
Figure 2B:
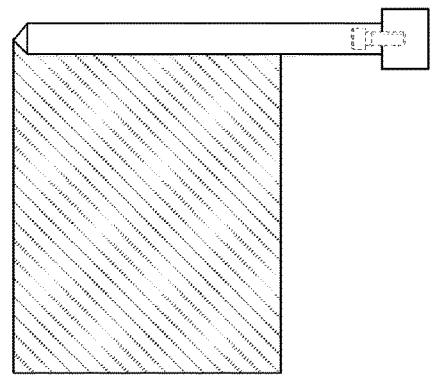
Figure 2A:
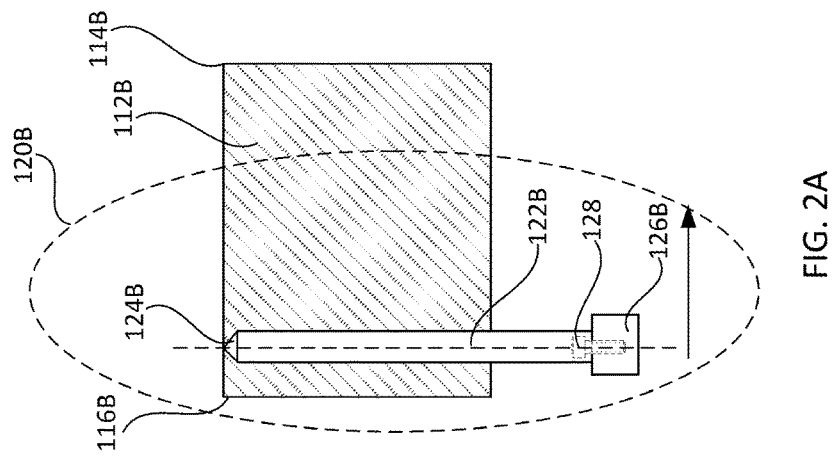

FIGS. 2A-2D show an example operation where the wiper 120B rotates about its longitudinal axis to remove debris and contaminants. In FIG. 2A, the wiper 120B is moving in a direction from a left edge 116B of a window 112B towards a right edge 114B of the window 112B. The wiper arm 122B is oriented such that the wiper blade 124B is in contact with a surface of the window 112B. As the wiper arm 122B moves across the window 112B, the wiper blade 124B cleans the surface of the window 112B. In FIG. 2B, when the wiper 120B reaches the right edge 114B of the window 112B, the wiper 120B stops. At this point, it is likely that debris and contaminants from the window 112B had been collected on one or both surfaces of the wiper blade 124B. If the wiper 120B reverses direction and moves from the right edge 114B of the window 112B to the left edge 116B of the window 112B, at least some of the debris and contaminants collected on one or both surfaces of the wiper blade 124B would be transferred back onto the surface of the window 112B.

To address this, as shown in FIG. 2C, after the wiper 120B reaches the right edge 114B of the window 112B, the wiper arm 122B may be configured to rotate along its longitudinal axis by an angle such that the wiper blade 124B is no longer in contact with the surface of the window 112B. This way, the rotation may remove the debris and contaminants collected on the wiper blade 124B. Then, in FIG. 2D, the wiper arm 122B may rotate back such that the wiper blade 124B is again in contact with the surface of the window 112B. The wiper 120B then moves in the opposite direction from the right edge 114B of the window 112B to the left edge 116B of the window 112B. Since the wiper blade 124B shook off the debris and contaminants before reversing direction, the wiper 120B does not drag the debris back and forth on the window 112B as it reverses direction. In this regard, one or more processors may be configured to control the second motor to rotate the wiper arm 122B each time before the wiper 120B reverses its direction of movement at one of the edges 114B, 116B of the window 112B. The one or more processors may also be configured to control a speed of the second motor so that the rotation of the wiper arm 122B has sufficient speed to remove the debris and contaminants collected on the wiper blade 124B.

Figure 3D:
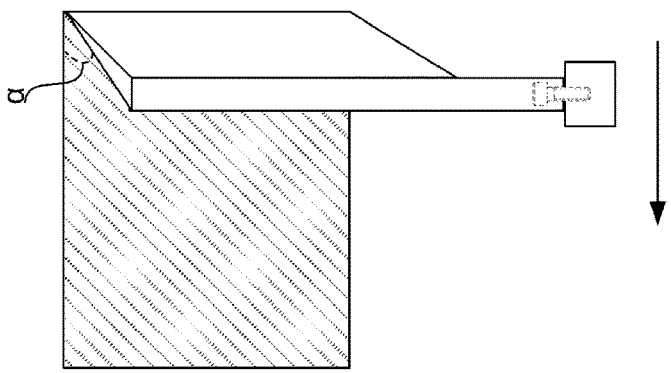
FIGS. 3A-D are illustrations of another example operation of the example according to aspects of the disclosure.
Figure 3C:
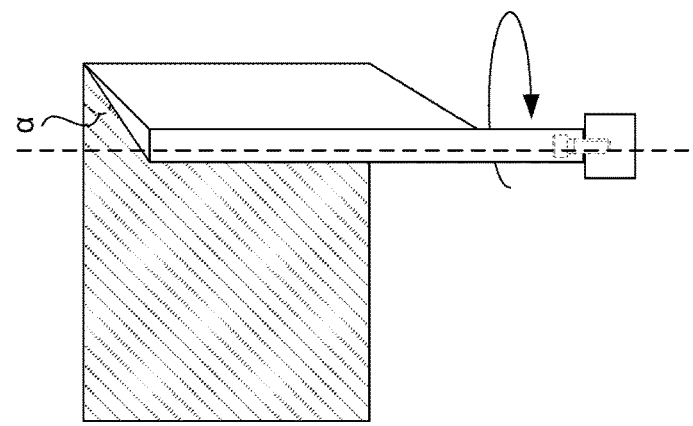
Figure 3B:
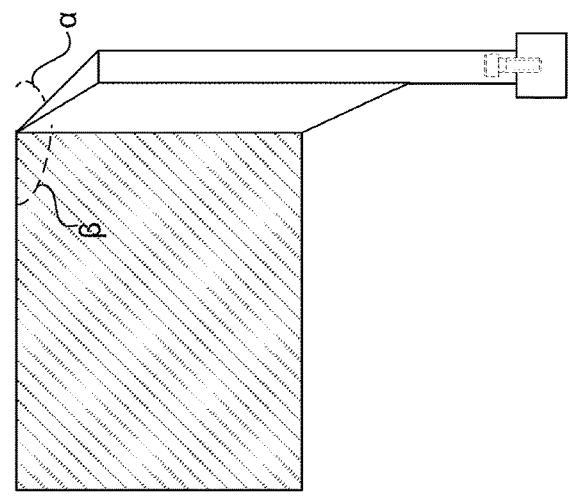
Figure 3A:
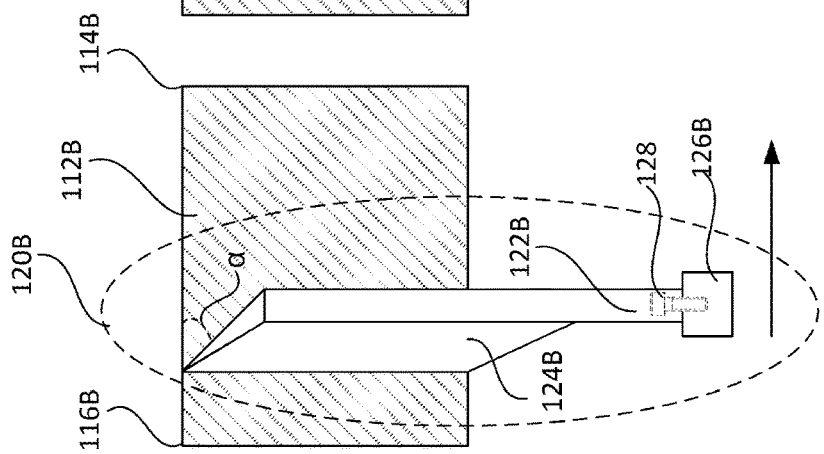

FIGS. 3A-3D show an example operation where the wiper 120B rotates about its longitudinal axis to maintain an advantageous contact angle with the surface of the window 112B. In this example, the wiper arm 122B is configured to rotate such that the wiper blade 124B contacts a surface of the window 112B at a non-perpendicular angle towards a movement direction of the wiper 120B. Such an orientation may allow the wiper blade 124B to provide better cleaning. In FIG. 3A, the wiper 120B is moving in a direction from a left edge 116B of the window 112B towards a right edge 114B of the window 112B. The wiper arm 122B is oriented such that the wiper blade 124B contacts the surface of the window 112B at an acute angle of α towards the movement direction of the wiper 120B. As the wiper arm 122B moves across the window 112B, the wiper blade 124B cleans the surface of the window 112B. In FIG. 3B, when the wiper 120B reaches the right edge 114B of the window 112B, the wiper 120B stops. At this point, if the wiper 120B reverses direction and moves from the right edge 114B of the window 112B to the left edge 116B of the window 112B, the wiper blade 124B would contact the surface of the window 112B at an oblique angle of β towards this new movement direction of the wiper 120B.

To address this, as shown in FIG. 3C, after the wiper 120B reaches the right edge 114B of the window 112B, the wiper arm 122B may be configured to rotate by an angle such that, when the movement direction of the wiper 120B reverses, the wiper blade 124B would still contact the surface of the window 112B at the acute angle α towards the movement direction of the wiper 120B. This way, the desired angle for cleaning the surface of the window 112B is restored for the opposite direction. Then, in FIG. 3D, as the wiper 120B moves in the opposite direction from the right edge 114B of the window 112B to the left edge 116B of the window 112B, the wiper blade 124B continues to clean the surface of the window 112B at this angle α towards the movement direction. In this regard, one or more processors may be configured to control the second motor to rotate the wiper arm 122B each time before the wiper 120B reverses its direction of movement.

In other examples, the wiper arm 122B may be further configured to pivot or rotate about a horizontal axis such that the wiper arm 122B may rotate to be stowed in a position generally parallel to a section of the wiper ring 130. For instance, the wiper arm 122B may be pivotally connected to the wiper support 126B, for example through a pin or a screw (not shown), such that the wiper arm 122B may rotate from an upright position to a stowed position, and vice versa. A third motor (not shown here, shown as 650 in FIG. 6) may be provided to rotate the wiper arm 122B from the upright position to the stowed position, and vice versa. In this regard, one or more processors may be configured to control the third motor to rotate the wiper arm 122B to the stowed position whenever the wiper 120B is not needed, and rotate the wiper arm 122B to the upright position when the wiper 120B is needed. For example, whether the wiper 120B is needed may be determined based on sensor signals from the one or more sensors for detecting an amount of debris. This way, when the wiper 120B is not needed, the wiper arm 122B and wiper blade 124B may be moved into a stowed position, which may completely eliminate any obstruction the wiper 120B may have on the sensors 160 in the sensor housing 110, as well as protect the wiper arm 122B and the wiper blade 124B from environmental elements such as strong wind.

Figure 4:
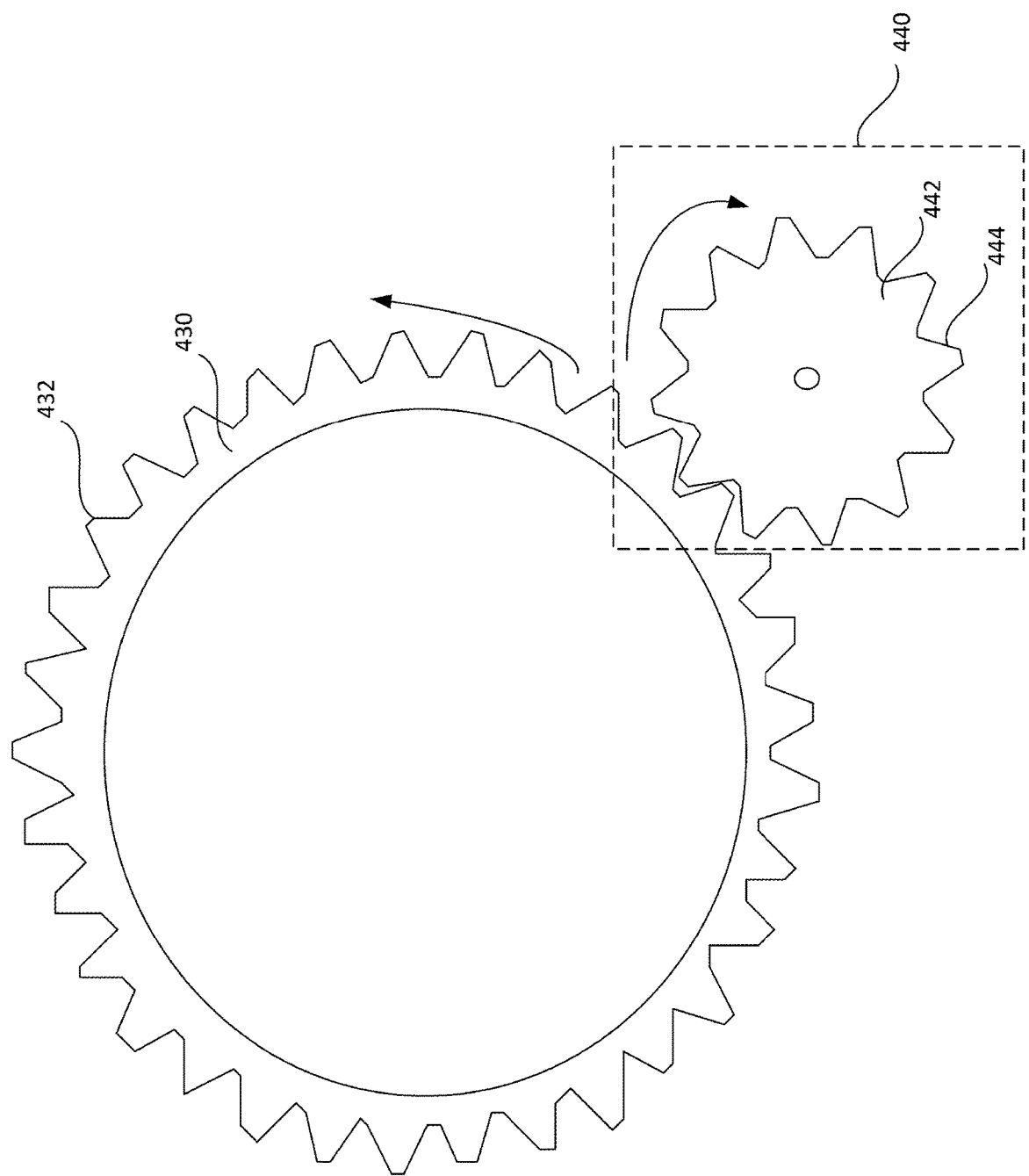
FIG. 4 illustrates another example wiper system in accordance with aspects of the disclosure.

FIG. 4 shows another example wiper system 400 according to aspects of the disclosure. Example wiper system 400 includes many of the features of example wiper system 100, but with certain differences as discussed further below. For example, though not shown, the wiper system 400 may include the same sensor housing 110, the base plate 150, the ring supports 152, the plurality of windows 112, the sensors 160, and the plurality of wipers 120 as in the example wiper system 100. However, the example wiper system 400 has a wiper ring 430 and a drive system 440 that are different from that of example wiper system 100. As shown, instead of a friction wheel, the drive system 440 includes a gear 442 provided with a first set of grooves 444 that matches a second set of grooves 432 provided on an outer surface of the wiper ring 430. As such, the first set of grooves 444 on the gear 442 are configured to engage the second set of grooves 432 on the outer surface of the wiper ring 430. Thus, as the gear 442 of the drive system 440 rotates, for instance when driven by the motor (not shown here, shown as 650 in FIG. 6), the rotation of the gear 442 causes the wiper ring 430 to rotate in an opposite direction, which in turn causes the plurality of wipers attached on the wiper ring 430 to rotate along. The gear 442 may be comprised of rigid materials, such as metals, plastics, and glass.

Although not shown, other types of drive systems may be used for wiper system 100. For example, a direct drive system may be used, where the motor may be positioned at a center of the wiper ring 130, and one or more spokes may connect the motor to the wiper ring such that a rotation of the motor causes the one or more spokes to rotate the wiper ring. For another example, a bell crank drive system may be used for wiper system 100, where a first end of a crank may be pivotally connected to the motor and a second end of the crank may be pivotally connected to the wiper ring, such that a rotation of the motor causes the crank to rotate the wiper ring 130.

In some instances, where the plurality of wipers rotate along a curve, such as along the wiper ring, to clean windows that have flat surfaces, the force applied by the wiper blades on the windows may vary as the wiper blades travel across the windows. Such variations in force may cause the wiper blades to no longer be in contact with the window surface at times, and/or cause damage to the wipers or the windows. In this regard, features may be provided on the wiper blades to counteract these forces. For instance, FIG. 7A shows another example wiper system 700A. Example wiper system 700A includes many of the features of example wiper system 100, but with certain differences as discussed further below. For example, as shown in FIG. 7A, the wiper system 700A may include the same sensor housing 110, the wiper ring 130, and the plurality of windows such as window 112A as in the example wiper system 100. For another example, though not shown in FIG. 7A, the wiper system 700A may further include the same drive system 140, the base plate 150, and the sensors 160 as in the example wiper system 100.

However, as shown in FIG. 7A, the plurality of wipers, including wiper 720A, in wiper system 700A have different configurations as the plurality of wipers 120 in wiper system 100. For example, as shown, wiper 720A includes a wiper arm 722A that is pivotally connected to the wiper ring 130 and pivotally connected to a wiper blade 724A. For instance, wiper arm 722A may be pivotally connected to the wiper ring 130 through an arm spring 723A, and pivotally connected to the wiper blade 724A through a pin 725A. Further as shown, wiper blade 724A also includes rollers 726A and 727A.

As the wiper ring 130 rotates, wiper 720A rotates with wiper ring 130, and wiper blade 724A makes contact with the surface of window 112A. As such, spring force from arm spring 723A presses wiper blade 724A against the surface of window 112A. However, as shown, since the surface of window 112A is flat, but the wiper ring 130 is curved, the forces applied by the wiper blade 724A onto the window 112A will vary as wiper blade 724A travels from right edge 114 of window 112A to left edge 116 of window 112A.

For example, wiper 720A is shown at two different positions in FIG. 7A, next to right edge 114 of window 112A and at center 118 of window 112A. The force applied by wiper blade 724A near edges 114 and 116 of window 112A are greater than the force applied by wiper blade 724A at center 118 of window 112A. At some points along the window, such as near center 118 of window 112A, if wiper blade 724A is not pressed with enough force against window 112A, wiper blade 724A may not be effective in cleaning window 112A. At other points along the window, such as near edges 114 and 116 of window 112A, if wiper blade 724A is pressed with too much force against window 112A, wiper blade 724A may rotate and no longer be in contact with window 112A and therefore also not effective in cleaning window 112A. Further, pressing wiper blade 724A with too much force may also cause damage to window 112A or wiper 720A.

As such, rollers 726A and 727A are provided on each end of wiper blade 724A to counteract the force applied by wiper blade 724A against window 112A and ensure that the relative position of the wiper blade 724A with respect to the window 112A remains consistent. For instance, when the force from wiper blade 724A against window 112A is at its greatest at edges 114 and 116 of window 112A, rollers 726A and 727A exert greater counteracting forces against wiper blade 724A; when the force from wiper blade 724A is at its lowest near center 118 of window 112A, rollers 726A and 727A exert less counteracting forces against wiper blade 724A. This way, rollers 726A and 727A ensure that wiper blade 724A remain in contact with the surface of window 112A with a generally consistent force, despite that wiper 720A travels in a curved path to wipe the flat surface of window 112A. Further, this ensure that forces from wiper blade 724A are spread out vertically between rollers 726A and 727A to prevent damage to window 112A and wiper 720A. The rollers 726A and 727A may be made of an elastic material, such as rubber, to provide gradual counteracting forces.

Further, the wiper blades may drag across the window as the wiper blades are pulled across the window surface. In this regard, features may be provided at edges of windows to separate the wiper blades from the window surface so that orientations of the wiper blades may be reset each time the wiper blades are moved across the window surfaces. As shown in FIG. 7A, ramps may be provided on the sensor housing 110 along edges of the plurality of windows, such as ramp 772A at edge 114 of window 112A and ramp 774A at left edge 116 of window 112A. The ramps 772A and 774A adjust the orientation of the wiper blade 724A. For instance, as wiper 720A approaches edge 114 from the right side of window 112A, ramp 772A pushes up against rollers 726A and 727A, forcing wiper blade 724A to adjust its orientation before reaching edge 114 of window 112A. Likewise, once reaching beyond left edge 116 and reversing in direction, ramp 774A pushes up against wiper blade 724A to adjust its orientation before reaching left edge 116 of window 112A.

To provide additional stability and additional counteracting forces against the wiper blades, more than two rollers may be provided for each wiper blade. FIG. 7B shows another example wiper system 700B. Example wiper system 700B includes many of the features of example wiper system 100 and 700A, but with certain differences as discussed further below. For example, as shown in FIG. 7B, the wiper system 700B may include the same sensor housing 110, the wiper ring 130, the base plate 150, the sensors 160, and the plurality of windows such as window 112A as in the example wiper system 100. For another example, though not shown in FIG. 7B, the wiper system 700B may further include the same drive system 140 as in the example wiper system 100. Further, as shown in FIG. 7B, the plurality of wipers, including wiper 720B, in wiper system 700B have similar configuration as wiper 720A of wiper system 700A. For example, as shown, wiper 720B also includes a wiper arm 722B pivotally connected to the wiper ring 130, and pivotally connected to wiper blade 724B. Wiper system 700B also includes ramps 772B and 774B.

Figure 7C:
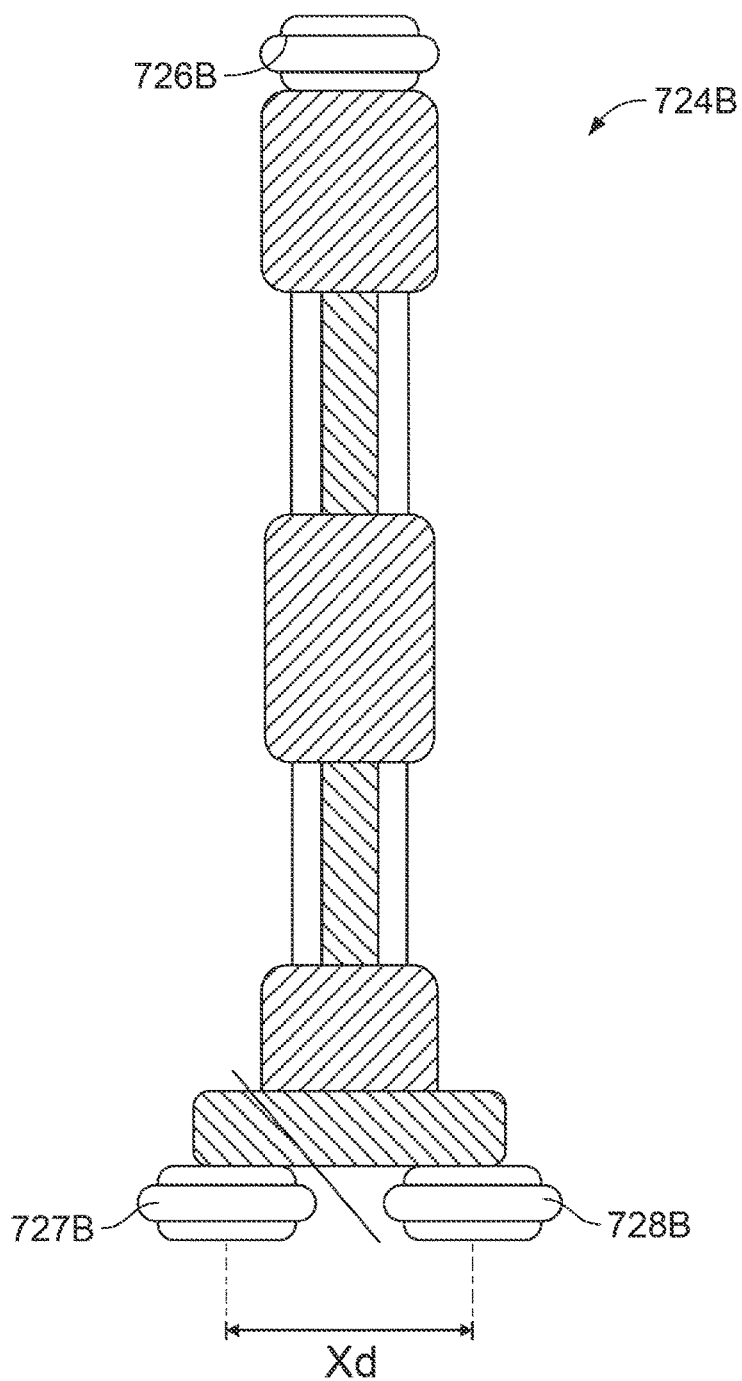

As shown in FIG. 7B, to improve stability of the wiper blade 724B, wiper blade 724B includes three rollers 726B, 727B, and 728B (rather than the two rollers shown in FIG. 7A). FIG. 7C shows details of wiper blade 724B. For example as shown in FIG. 7C, rollers 727B and 728B may be positioned at two sides of a bottom end of wiper blade 724B near wiper ring 130. As such, in addition to ensuring that force from wiper blade 724B is spread out along a length of wiper blade 724B, the two rollers 727B and 728B additionally ensure that force from wiper blade 724B are spread out in a horizontal direction. This way, rollers 726B, 727B, and 728B ensure that wiper blade 724B remain in contact with the surface of window 112A at more or less the same angle, despite that wiper 720B travels in a curved path to wipe the flat surface of window 112A.

Further, wiper system 700B provides additional movement freedom for wiper blade 724B than the wiper blade 724A in wiper system 700A. For instance, wiper arm 722B may be pivotally connected to the wiper ring 130 through an arm spring 723B, and pivotally connected to the wiper blade 724B through a ball joint 725B. The ball joint 725B allows wiper blade 724B to rotate along a horizontal axis with respect to wiper arm 722B as indicated by the dashed boxes shown in FIG. 7B.

Figure 5:
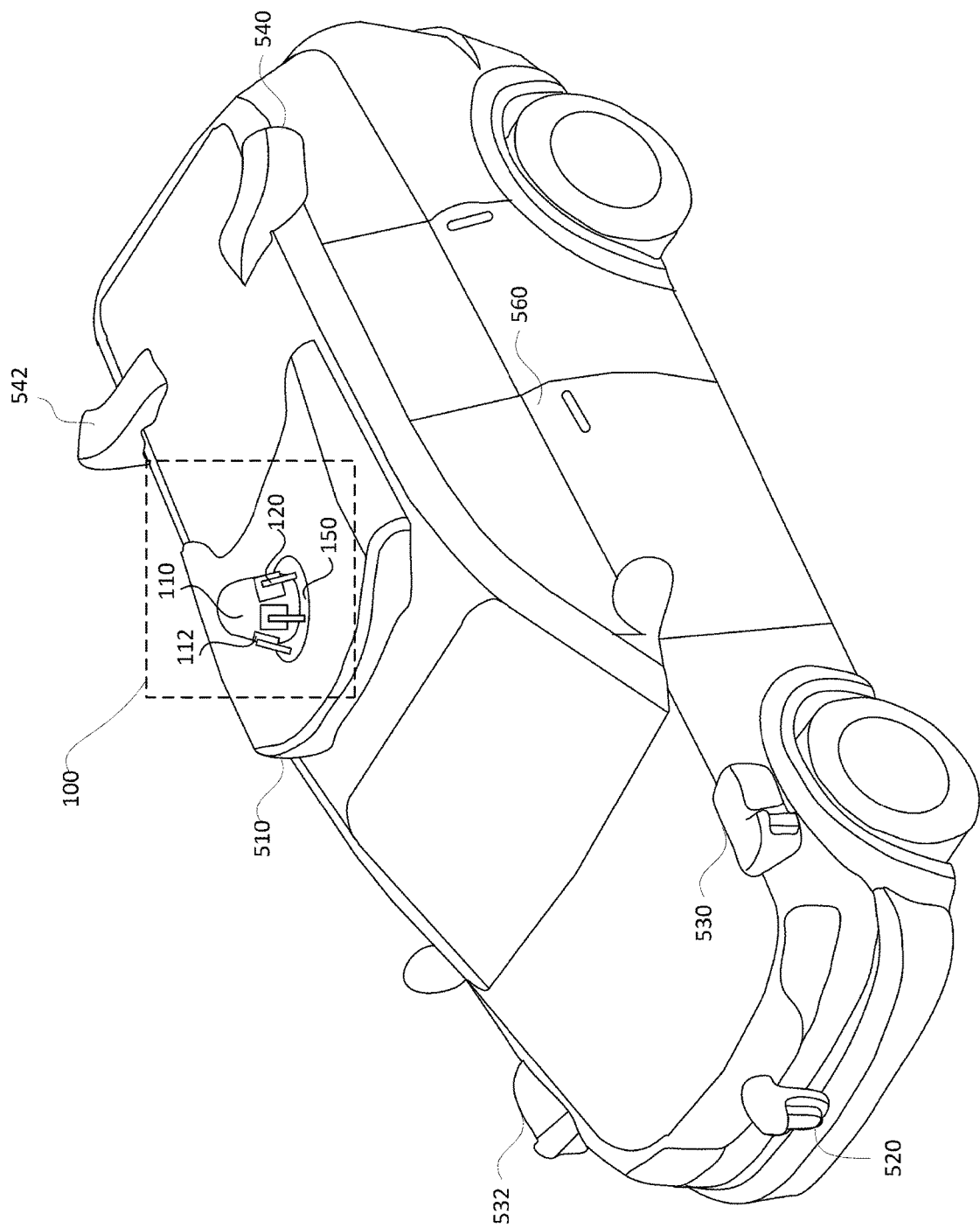
FIG. 5 is an example external view of a vehicle according to aspects of the disclosure.

Wiper systems 100, 400, 700A, and 700B can each be used with any type of vehicle assembly. While certain aspects of the disclosure are particularly useful in connection with specific types of vehicles, the vehicle assembly may be any type of vehicle assembly including, but not limited to, cars, trucks, motorcycles, busses, recreational vehicles, etc., capable of autonomous driving. Turning now to FIG. 5, there is shown an example vehicle assembly 500 onto which wiper system 100 is positioned. In this example, the sensor housing 110 is positioned on roof-top housing 510, the sensors 160 are inside the sensor housing 110. In addition, housing 520 located at the front end of vehicle assembly 500 and housings 530, 532 on the driver's and passenger's sides of the vehicle may each store a lidar sensor. For example, housing 530 is located in front of driver door 560. Vehicle assembly 500 also includes housings 540, 542 for radar units and/or cameras also located on the roof of vehicle assembly 500. Additional radar units and cameras (not shown) may be located at the front and rear ends of vehicle assembly 500 and/or on other positions along the roof or roof-top housing 510. In this example, vehicle assembly 500 is an autonomous vehicle, such as a vehicle that does not require a human driver and can be used to aid in the transport of passengers or items from one location to another. Such vehicle may operate in a fully autonomous mode where passengers may provide some initial input, such as a destination, and the vehicle maneuvers itself to that destination. In other examples, vehicle assembly 500 may require a human driver.

Vehicle assembly 500 also includes wiper system 100, which includes sensor housing 110 with the plurality of windows 112 and the plurality of wipers 120. Sensor housing 110 may be positioned on a planar base plate 150 that is positioned on top of vehicle assembly 500. One or more sensors 160, such as laser devices having 360° or narrower fields of view and/or one or more camera devices may be positioned within the sensor housing 110. In addition or alternatively, the sensors 160 may include, for example, one or more radar and/or sonar devices. In addition to the sensors 160 inside the sensor housing 110, there may be additional sensors located in other parts of the vehicle assembly 500. Each of the radar, camera, and laser devices may be associated with processing components which process data from these devices and provide sensor data to other systems in vehicle assembly 500, including the control system, which will be discussed in more detail herein. Examples of such data may include whether debris are encountered by the plurality of windows 112 and amount of debris encountered by the plurality of windows 112, and images of the plurality of windows 112.

Figure 6:
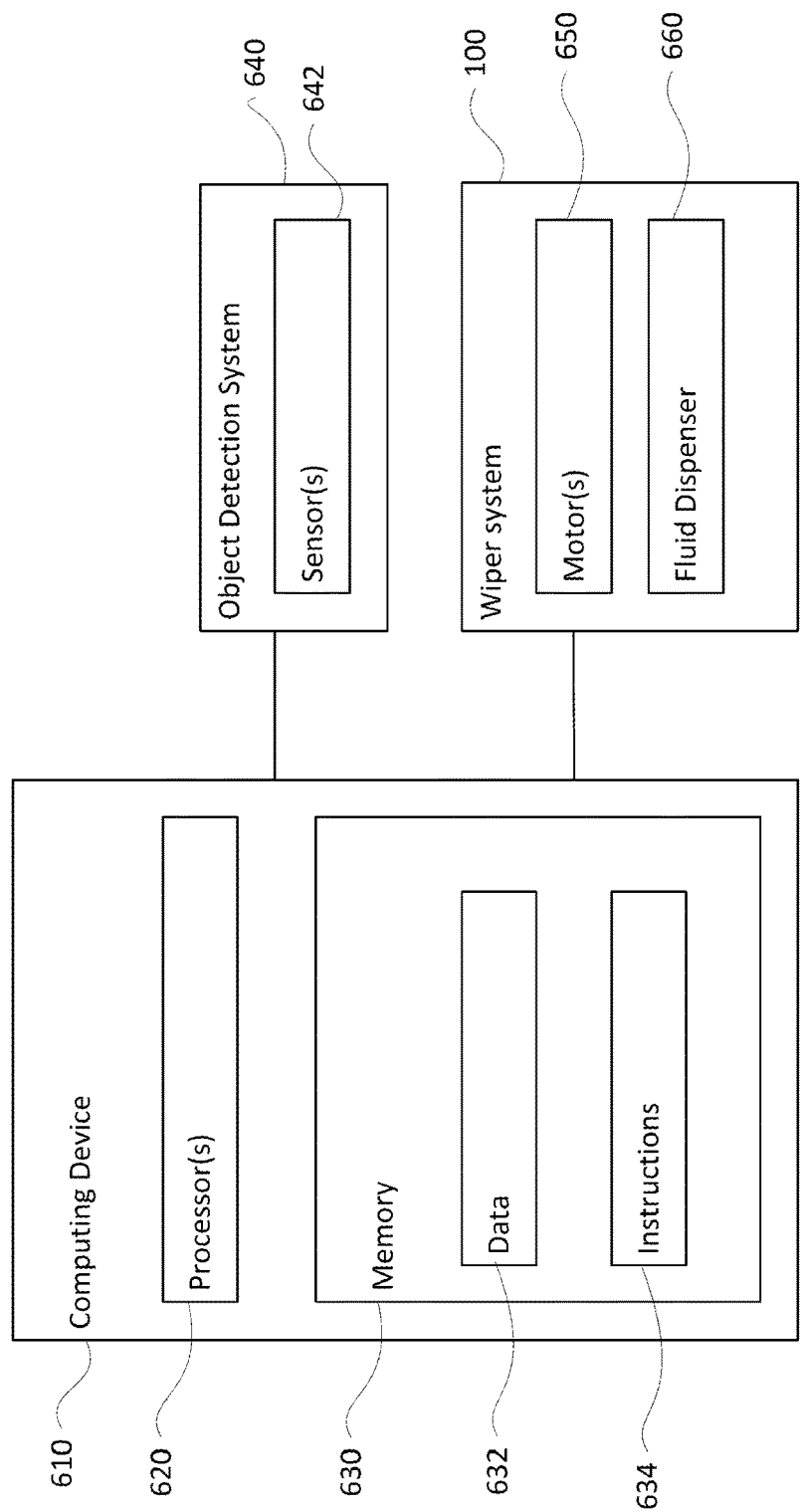
FIG. 6 is an example control system of a vehicle according to aspects of the disclosure.

FIG. 6 illustrates an example 600 of a control system for a vehicle assembly in which the features described above may be implemented. As shown, the control system 600 in accordance with one aspect of the disclosure may have one or more computing devices, such as vehicle computing device 610 containing one or more processors 620, memory 630 and other components typically present in general purpose computing devices. For example, the computing device 610 may be incorporated into the vehicle assembly 500. The computing device 610 may be capable of communicating with various components of the vehicle. For example, computing device 610 may be in communication with various systems of vehicle assembly 500, such as wiper system 100. For example, the computing device 610 may control one or more motor(s) 650 of the wiper system 100, which include the first motor that rotates the plurality of wipers 120 around the sensor housing 110, and optionally, the second motor that rotates the plurality of wipers 120 about their respective longitudinal axes, and the third motor that rotates the plurality of wipers 120 between a stowed and an upright position.

The memory 630 stores information accessible by the one or more processors 620, including data 632 and instructions 634 that may be executed or otherwise used by the processor 620. The memory 630 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 634 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 632 may be retrieved, stored or modified by processor 620 in accordance with the instructions 634. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 620 may be any conventional processors, such as commercially available CPUs. Alternatively, the one or more processors may be a dedicated device such as an ASIC or other hardware-based processor. Although FIG. 6 functionally illustrates the processor, memory, and other elements of computing device 610 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 610. Accordingly, references to a processor or computing device will be understood to include references to a collection of processors or computing devices or memories that may or may not operate in parallel.

Computing device 610 may receive signals from other systems in the vehicle assembly indicating that the plurality of wipers 120 of the wiper system 100 should be deployed. In such an example, computing device 610 may activate the third motor of the motor(s) 650 to rotate the plurality of wipers 120 to an upright position, and activate the first motor of the motor(s) 650 to rotate the wiper ring 130, so that the plurality of wipers 120 also rotate around the sensor housing 110. If signals indicate that the plurality of wipers 120 of the wiper system 100 should not be deployed, computing device 610 may deactivate the first motor and control the third motor to stow the plurality of wipers 120.

Computing device 610 can deploy the plurality of wipers of wiper system 100 when optical deterrents are present on the plurality of windows 112. For example, when rain, debris or the like are on the surface of plurality of windows 112 and occlude the sensors 160 positioned within the sensor housing 110, computing device 610 may receive a message or signal that the plurality of windows 112 are occluded. The message may be transmitted from another system within the vehicle assembly that detects the presence of optical deterrents on the plurality of windows 112, such as an object detection system 640. The object detection system 640 can include its own memory, data, instructions, and processors.

In one example, object detection system 640 may include one or more sensor(s) 642 for detecting an amount of debris encountered by the plurality of windows 112. For example, the sensor(s) 642 may include one or more of the sensors 160 inside the sensor housing 110, or other sensors located elsewhere on the vehicle. For example, the sensor(s) 642 may be cameras, such as the same cameras that are used to gather information to maneuver the vehicle assembly. The processors of the object detection system 640 can conduct complex post processing using digital filters and logic on the received images to evaluate the quality of the received image and determine if occlusions are present on the plurality of windows 112, and if so, an amount of debris present on the plurality of windows 112. Alternatively or additionally to such cameras, the sensor(s) 642 may include other types of sensors, such as ones that can detect a weight or pressure on the plurality of windows 112.

Once the wiper system 100 is deployed, computing device 610 may further control the motor(s) 650. For example, the processors 620 of the computing device 610 may send signals to the first motor such that the drive system 140 rotates the wiper ring 130 back and forth by a fixed distance. For another example, the processors 620 of the computing device 610 may change a speed of the first motor based on the amount of debris encountered and/or the number of consecutive sensor signals transmitted by the sensor(s) 160 where the wipers 120 are not visible to the sensor(s). For yet another example, the processors 620 may be configured to control the second motor to rotate the plurality of wipers 120 about their respective longitudinal axes each time before the plurality of wipers 120 reverse their direction of movement. For still another example, the processors 620 may be configured to control a speed of the second motor so that the rotation of the plurality of wipers 120 has sufficient speed to remove the debris and contaminants collected on their wiper blades.

Computing device 610 may also receive signals indicating the positions of the plurality of wipers 120 of the wiper system 100 and provide signals to other systems. For example, computing device 610 may control the fluid dispenser 660 to dispense fluid through spray nozzles positioned around the sensor housing 110 or inside the plurality of wipers 120.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
a plurality of windows spaced apart and around a circumference of a sensor housing;
a wiper ring;
a plurality of wipers fixedly attached to the wiper ring, each given one of the plurality of wipers including a wiper blade;
a drive system coupled to the wiper ring; and
a first motor coupled to the drive system, the first motor configured to drive the drive system to rotate the wiper ring around the circumference of the sensor housing in two different directions such that each given one of the plurality of wipers repeatedly moves back and forth between a pair of opposing edges of a corresponding window of the plurality of windows in order to remove debris from the plurality of windows.

2. The system of claim 1, wherein the first motor is configured to drive the drive system such that each given one of the plurality of wipers moves from a first edge of the pair of opposing edges of the corresponding window of the given one of the plurality of wipers to a second edge of the pair of opposing edges of the corresponding window of the given one of the plurality of wipers in a first direction, and from the second edge of the pair of opposing edges of the corresponding window of the given one of the plurality of wipers to the first edge of the pair of opposing edges of the corresponding window of the given one of the plurality of wipers in a second direction opposite of the first direction.

3. The system of claim 1, wherein the drive system includes a friction wheel in contact with the wiper ring such that, when the friction wheel rotates in a first direction, a friction force between the friction wheel and the wiper ring causes the wiper ring to rotate in a second direction opposite of the first direction.

4. The system of claim 1, wherein the drive system includes a gear having a first set of grooves configured to engage with a second set of grooves on the wiper ring such that rotation of the gear in a first direction causes the wiper ring to rotate in a second direction opposite of the first direction.

5. The system of claim 1, further comprising a second motor configured to rotate each given one of the plurality of wipers about a respective longitudinal axis of the given one of the plurality of wipers in order to change an orientation of the wiper blade of the given one of the plurality of wipers relative to the corresponding window of the given one of the plurality of wipers when changing between moving in a first direction towards a first edge of the pair of opposing edges and moving in a second direction opposite of the first direction towards a second one of the pair of opposing edges.

6. The system of claim 1, wherein each given one of the plurality of wipers is configured to rotate about a respective longitudinal axis of the given one of the plurality of wipers such that the wiper blade of the given one of the plurality of wipers is not in contact with a surface of the corresponding window for the given one of the plurality of wipers in order to change an orientation of the wiper blade of the given one of the plurality of wipers relative to the corresponding window of the given one of the plurality of wipers when changing between moving in a first direction towards a first edge of the pair of opposing edges and moving in a second direction opposite of the first direction towards a second one of the pair of opposing edges.

7. The system of claim 6, wherein each given one of the plurality of wipers is further configured to rotate about the respective longitudinal axis of the given one of the plurality of wipers when the given one of the plurality of wipers reaches one of the opposing edges of the corresponding window for the given one of the plurality of wipers.

8. The system of claim 1, wherein each given one of the plurality of wipers is configured to rotate about a respective longitudinal axis of the given one of the plurality of wipers such that the wiper blade of the given one of the plurality of wipers contacts a surface of the corresponding window for the given one of the plurality of wipers at a non-perpendicular angle towards a movement direction of the given one of the plurality of wipers in order to change an orientation of the wiper blade of the given one of the plurality of wipers relative to the corresponding window of the given one of the plurality of wipers when changing between moving in a first direction towards a first edge of the pair of opposing edges and moving in a second direction opposite of the first direction towards a second one of the pair of opposing edges.

9. The system of claim 8, wherein the given one of the plurality of wipers is configured to rotate about the respective longitudinal axis of the given one of the plurality of wipers when the given one of the plurality of wipers reaches one of the opposing edges of the corresponding window for the given one of the plurality of wipers.

10. The system of claim 1, further comprising one or more sensors positioned inside the sensor housing, the one or more sensors configured to transmit signals through at least one of the plurality of windows spaced apart and around the circumference of the sensor housing.

11. The system of claim 10, wherein the first motor is configured to drive the drive system to rotate the wiper ring at a first threshold speed, wherein, when driven at the first threshold speed, the plurality of wipers are not visible to the one or more sensors for at least one of a predetermined number of consecutive signal transmissions.

12. The system of claim 1, further comprising one or more sensors for detecting an amount of debris encountered by the sensor housing.

13. The system of claim 12, wherein the first motor is configured to drive the drive system to rotate the wiper ring at a second threshold speed, and wherein, when driven at the second threshold speed, at least one of a predetermined number of consecutive signal transmissions are made through the plurality of windows with a threshold amount of debris.

14. The system of claim 1, further comprising a vehicle, wherein the sensor housing is mounted on a roof of the vehicle.

15. The system of claim 1, further comprising a vehicle having one or more processors configured to control movements of the first motor.

16. The system of claim 15, wherein the one or more processors are configured to receive sensor signals from one or more sensors for detecting an amount of debris encountered by the sensor housing, and control operation of the first motor based on the sensor signals.

17. The system of claim 15, wherein the one or more processors are configured to receive sensor signals from one or more sensors positioned inside the sensor housing, and control operation of the first motor based on a quality of the sensor signals.

18. The system of claim 1, further comprising:
a plurality of springs, each of the plurality of springs pivotally connecting a wiper arm of the given one of the plurality of wipers to the wiper ring; and
a plurality of rollers, each given one of the plurality of rollers being attached to a corresponding wiper blade of one of the plurality of wipers, the given one of the plurality of rollers being configured to counteract a force between the corresponding wiper blade of the one of the plurality of wipers and one of the plurality of windows.

19. The system of claim 1, further comprising a plurality of rollers, pairs of the plurality of rollers being positioned at two sides of one end of a corresponding wiper blade of one of the plurality of wipers, the pairs of the plurality of rollers being configured to counteract a force between the corresponding wiper blade of the one of the plurality of wipers and one of the plurality of windows.

20. The system of claim 1, further comprising:
at least one ramp positioned on the sensor housing along one of the opposing edges of at least one of the plurality of windows, the at least one ramp being configured to push against a roller of a wiper of the at least one of the plurality of windows so that an orientation of the wiper blade of the wiper of the at least one of the plurality of windows is adjusted.

21. The system of claim 1, further comprising:
a ball joint pivotally connecting a wiper arm to the wiper blade of each given one of the plurality of wipers such that the wiper blade of each given one of the plurality of wipers is configured to rotate about a horizontal axis with respect to the wiper arm of the given one of the plurality of wipers.

* * * * *